(12) United States Patent
Golin et al.

(10) Patent No.: US 10,554,430 B2
(45) Date of Patent: Feb. 4, 2020

(54) SYSTEMS AND METHODS FOR PROVIDING ADAPTIVE FLOW CONTROL IN A NOTIFICATION ARCHITECTURE

(71) Applicant: Everbridge, Inc., Pasadena, CA (US)

(72) Inventors: Eric Golin, Newton, MA (US); Jia Xi, Lexington, MA (US); Yuanjin Xu, Burlington, MA (US)

(73) Assignee: Everbridge, Inc., Pasadena, CA (US)

( * ) Notice: Subject to any disclaimer, the term of this patent is extended or adjusted under 35 U.S.C. 154(b) by 67 days.

(21) Appl. No.: 15/820,339

(22) Filed: Nov. 21, 2017

(65) Prior Publication Data

US 2018/0145842 A1 May 24, 2018

Related U.S. Application Data

(60) Provisional application No. 62/425,037, filed on Nov. 21, 2016, provisional application No. 62/425,033, filed on Nov. 21, 2016.

(51) Int. Cl.
*H04L 12/18* (2006.01)
*H04L 12/851* (2013.01)
(Continued)

(52) U.S. Cl.
CPC .......... *H04L 12/1895* (2013.01); *H04L 47/24* (2013.01); *H04L 47/30* (2013.01); *H04L 49/15* (2013.01)

(58) Field of Classification Search
CPC ..... H04L 12/1895; H04L 47/24; H04L 47/30; H04L 47/621
See application file for complete search history.

(56) References Cited

U.S. PATENT DOCUMENTS

2013/0089101 A1* 4/2013 Kamath .............. H04L 47/2458
370/400
2014/0068611 A1* 3/2014 McGrath ............. G06F 9/45533
718/1
(Continued)

OTHER PUBLICATIONS

Ronglong, S. et al. "Signal: An Open-Source Cross-Platform Universal Messaging System with Feedback Support" Journal of Systems & Software, vol. 117, (2016): 25 pages.
(Continued)

*Primary Examiner* — Walter J Divito
*Assistant Examiner* — Anthony Luo
(74) *Attorney, Agent, or Firm* — Norton Rose Fulbright US LLP

(57) ABSTRACT

Systems, methods, and computer-readable storage media for providing a notification system are disclosed. The notification system may be configured to select one or more notification requests from each of a plurality of notification request queues, and generate a plurality of attempts for each of the one or more selected notification requests. The attempts may be assigned to one of a first plurality of attempt queues, and flow control logic may be executed against the first plurality of attempt queues to dynamically select attempts for transmission from among the first plurality of attempt queues. Selected attempts are inserted into one of a second plurality of attempt queues, and a plurality of connectors may be configured to select attempts from the second plurality of attempts queues for transmission via a communication channel.

20 Claims, 6 Drawing Sheets

(51) Int. Cl.
  *H04L 12/885* (2013.01)
  *H04L 12/933* (2013.01)
  *H04L 12/835* (2013.01)

(56) References Cited

U.S. PATENT DOCUMENTS

| | | | |
|---|---|---|---|
| 2014/0282694 A1* | 9/2014 | Zaveri | H04N 21/4882 |
| | | | 725/32 |
| 2016/0103750 A1* | 4/2016 | Cooper | G06F 11/3495 |
| | | | 719/328 |
| 2016/0275123 A1* | 9/2016 | Lin | G06F 9/4881 |
| 2017/0171112 A1* | 6/2017 | Saint-Etienne | H04L 12/4641 |
| 2017/0214762 A1 | 7/2017 | Swain et al. | |
| 2018/0024929 A1* | 1/2018 | Greiner | G06F 12/0862 |
| | | | 711/137 |
| 2018/0212710 A1* | 7/2018 | Ronneke | H04L 1/0002 |
| 2019/0021032 A1* | 1/2019 | Bergstrom | H04W 72/1284 |

OTHER PUBLICATIONS

Anonymous "Official Guide to Notification Systems for Operators, Device Makers and Developers" NewBay White Paper, Mar. 2011, 17 pages.

International Search Report and Written Opinion issued for PCT Application No. PCT/US2017/062870, dated Feb. 27, 2018, 15 pages.

\* cited by examiner

SYSTEMS AND METHODS FOR PROVIDING ADAPTIVE FLOW CONTROL IN A NOTIFICATION ARCHITECTURE

CROSS REFERENCE TO RELATED APPLICATION

The present application claims the benefit of U.S. Provisional Patent Application No. 62/425,033 filed Nov. 21, 2016 and entitled "SYSTEMS AND METHODS FOR PROVIDING ADAPTIVE FLOW CONTROL IN A NOTIFICATION ARCHITECTURE," and claims the benefit of U.S. Provisional Patent Application No. 62/425,037 filed Nov. 21, 2016 and entitled "SYSTEMS AND METHODS FOR PROVIDING AN IMPROVED NOTIFICATION SYSTEM ARCHITECTURE," the disclosures of which are incorporated by reference herein in their entirety.

TECHNICAL FIELD

The present application is generally related to notification systems. More particularly, the present application is directed to systems, methods, and computer-readable storage media providing improved techniques for distributing notifications via a notification system.

BACKGROUND

Notification systems are configured to transmit notifications to one or more intended recipients. Notifications may be provided to the one or more intended recipients via different types of messages, such as text messages (e.g., short messaging service (SMS) messages), multimedia messaging service (MMS) messages, e-mail messages, automated voice response (AVR) system messages, and the like. However, existing notification systems suffer from several drawbacks, such as experiencing performance degradation for certain types of messages or under particular load conditions.

SUMMARY

Notification systems are designed to generate and broadcast messages to one or more intended recipients. A notification broadcast may comprise transmission of a plurality of messages, referred to herein as attempts. The plurality of messages may comprise different types of attempts, such as e-mail messages, automated voice response (AVR) messages, short messaging system (SMS) messages, or other types of messages, and each different type of attempt may utilize a different communication channel or path to transmit the attempt to the intended recipient. For example, an attempt utilizing an SMS message may be transmitted to the intended recipient utilizing infrastructure of a cellular network, transmission of an AVR message may utilize infrastructure of a public switched telephone network (PSTN) and/or cellular network, and transmission of an e-mail message may utilize the Internet and one or more servers (e.g., one or more e-mail servers).

Notification broadcasts may be requested for various reasons and/or purposes. For example, if an emergency situation (e.g., a fire, a tornado, a multi-car collision, and the like) occurs in a particular geographic area or location, an entity may request transmission of a notification broadcast in a particular geographic area to inform intended recipients (e.g., people living in, or proximate to the particular geographic area) of the emergency situation. As another example, an entity hosting an event that is open to the public may request transmission of a notification broadcast to inform members of the public of the event and to encourage attendance of the event. It is noted that there are numerous other types of situations for which notification broadcasts may be requested, and the specific examples above have been provided for purposes of illustration, rather than by way of limitation.

Notification systems in accordance with embodiments may be configured to account for the particular circumstances surrounding a request for a notification broadcast. For example, notification broadcasts associated with emergency situations may require faster processing (e.g., to protect the public) than a notification broadcast to inform people in a particular geographic area of an upcoming concert or event. To facilitate prioritized handling of notification requests, each notification request may be assigned a priority level, which may indicate how urgently the notification should be sent to the intended recipients by the notification system. For example, a notification request for an emergency situation may be configured with a high priority level and the high priority level may be interpreted by the notification system as an indication that the notification broadcast needs to be sent so that the notification is reaches the intended recipients immediately (e.g., with as little delay as possible), while a notification announcing a future date when a musician will perform a concert at a particular city/venue may configured with a low priority level (e.g., because the notification is sent with regard to a future date, some delay in the notification being received by the intended recipients is acceptable). Allowing priority levels to be assigned to notification requests provides a mechanism through which the notification system can prioritize processing and transmission of broadcasts to intended recipients. However, utilizing priority levels often degrades system performance in presently available notification systems.

As an example, some notification systems use a binary priority scheme where notifications may be prioritized as high priority or low priority. Such notification systems are further configured with a fixed interpretation such that the notification system always processes high priority notifications before processing low priority notifications. When the volume of notifications to be sent by the notification system is below a threshold capacity indicative of a low to moderate load on the notification system, the high and low priority notifications may be processed in a timely manner (e.g., in accordance with their assigned priorities). However, as the volume of notifications increases above the threshold capacity (e.g., a scenario indicative of a high load on the notification system), starvation may occur based on priority of different notifications, resulting in notifications not being sent to the intended recipients in a timely manner (e.g., transmission of the notifications is delayed an unreasonable amount of time according to the assigned priorities). This may result in the notification system not processing certain notifications, thereby causing an unreasonable amount of delay with respect to transmitting those notifications. It is noted that starvation in such systems will typically negatively impact distribution or dissemination of low priority notifications, but may also delay high priority notifications under certain high load conditions.

In addition to problems arising from how existing notification systems utilize priority levels to process notification requests, presently available notification systems also experience performance degradation due to factors associated with sizes of broadcasts, where the size of the broadcast (e.g., the number of people included in the pool of intended recipients) may vary depending on the subject matter to which the notification relates and/or the situation giving rise to the notification request. For example, in a natural disaster situation, such as a hurricane, a notification may be sent out in advance of the hurricane making landfall. The size of this type of notification may be very large because the pool of intended recipients may include many persons (e.g., people in the geographic areas where the hurricane may pose a threat to public safety). Other notifications may be smaller because the pool of intended recipients is smaller (e.g., as little as one intended recipient). In presently available notification systems, transmission of a small broadcast may be delayed because the notification system is transmitting a large notification. In these situations, the sender of the small notification may have an expectation that the small notification will be sent within a reasonable amount of time, but this expectation may not be met when the notification system is busy transmitting the large notification. Thus, prioritizing transmission of notifications based on the order in which the notification requests are received is not satisfactory.

Notification systems in accordance with embodiments of the present disclosure are configured to implement adaptive flow control techniques that overcome the disadvantages of presently available notification systems with respect to how notifications are processed for transmission. Notification systems of the present disclosure may implement adaptive flow control techniques at the notification request level, which may prevent delays and/or starvation with respect to the selection of notification requests for further processing, such as to expand the notification request into one or more attempts and transmitting the generated attempts as a notification broadcast to the intended recipients. For example, notification systems of embodiments may establish different notification request queues for different priority levels, and notification requests may be assigned to the different notification request queues based on their priority levels. Notification engines may subsequently apply a set of rules and weights to the notification request queues to select notification requests from the notification request queues for further processing and transmission. The set of rules and weights may be configured to prevent starvation and other undesirable handling of notification requests, such as the drawbacks described above with respect to existing notification systems.

Additionally, the notification systems may implement adaptive flow control techniques at the notification request level that account for size of requested broadcasts. For example, when establishing different notification request queues, notification systems in accordance with the present disclosure may establish multiple queues for each priority level, where each of the different queues is associated with a particular broadcast size. For example, the notification system may be configured to classify requested broadcasts into one of two sizes (e.g., large and small), and may establish a notification request queue for each broadcast size on a per-priority level basis (e.g., if two priority levels are utilized, the notification system may create a large and small queue for each priority level). To ensure fairness and present undesirable processing of the notification requests, the set of rules and weights may be configured to ensure that each queue receives adequate resources for processing notification requests from each of the different queues.

Further, notification systems in accordance with embodiments may utilize multiple notification engines to process notification requests, and may implement adaptive flow control techniques at the notification request level to account for various characteristics of the notification requests. For example, as described above, the notification system may establish multiple queues (e.g., on a per-priority level basis and/or taking into account broadcast size) for each notification engine, and may assign notification requests, in whole or in part, to notification request queues corresponding to particular notification engines based on characteristics of received notification requests. For example, if a first notification engine is established in the United States and a second notification engine is established in Europe, the notification system may assign notification requests targeting recipients in the United States to notification request queues established for the first notification system (e.g., based on priority, size, and other factors associated with the notification requests) and may assign notification requests targeting recipients in Europe to notification request queues established for the second notification system (e.g., based on priority, size, and other factors associated with the notification requests). Where a notification request identifies recipient across multiple geographic areas, the notification system may dynamically assign portions of the notification request to queues of different notification engines. For example, if a notification request identifies broadcast recipients in both the United States and Europe, the notification system may assign a first portion of the notification request (e.g., a portion associated with the broadcast recipients located in the United States) to a queue of the first notification engine and may assign a second portion of the notification request (e.g., a portion associated with the broadcast recipients located in Europe) to a queue of the second notification engine. Implementing adaptive flow control techniques at the notification request level using one or more of the techniques described above enables the notification systems to evenly distribute notification requests and provide load balancing. Further, by implementing a set of rules and weights, the notification system is able to ensure that notification requests are processed from all notification request queues having notification requests that need processing, thereby preventing large broadcasts from starving smaller broadcasts, as well as preventing high priority broadcasts from causing unreasonable delays with respect to processing lower priority broadcasts.

In addition to implementing adaptive flow control techniques at the notification request level, notification systems in accordance with the present disclosure may implement adaptive flow control techniques at the attempt generation and transmission levels. For example, as briefly described above, notification engines may be configured to retrieve notification requests from various queues for further processing. Once retrieved by the notification engine, a notification request may be expanded into one or more attempts, which may be placed in an attempt queue. As described above, attempts may be transmitted to recipients via various channels or distribution paths. In accordance with the present disclosure, attempt queues may be established on a per connector basis, where a connector corresponds to a communication device configured to communicatively couple the notification system to one of the various channels or distribution paths. As attempts are generated by the notification engine, they may be assigned to an attempt queue corresponding to the appropriate connector/communication path. For example, where an attempt is an SMS message, the notification engine may assign the attempt to an attempt queue corresponding to a connector that communicatively couples the notification system to a cellular network (or another type of communication network) having infrastructure configured to deliver SMS messages to the end user (e.g., the intended recipient of the attempt). Similar to the manner in which the notification system establishes multiple notification request queues, as described above, notification systems in accordance with the present disclosure may establish multiple attempt queues for each connector, where the multiple attempt queues may be associated with different priority levels. During processing of attempts from the attempt queues, a set of rules and weights may be applied to select attempts for transmission from each of the attempt queues, thereby mitigating starvation and preventing a large broadcast having many attempts from potentially delaying other attempts associated with other broadcasts. Additionally, notification systems in accordance with the present disclosure may implement throttling and back pressure techniques to further improve system performance, as described in more detail below.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
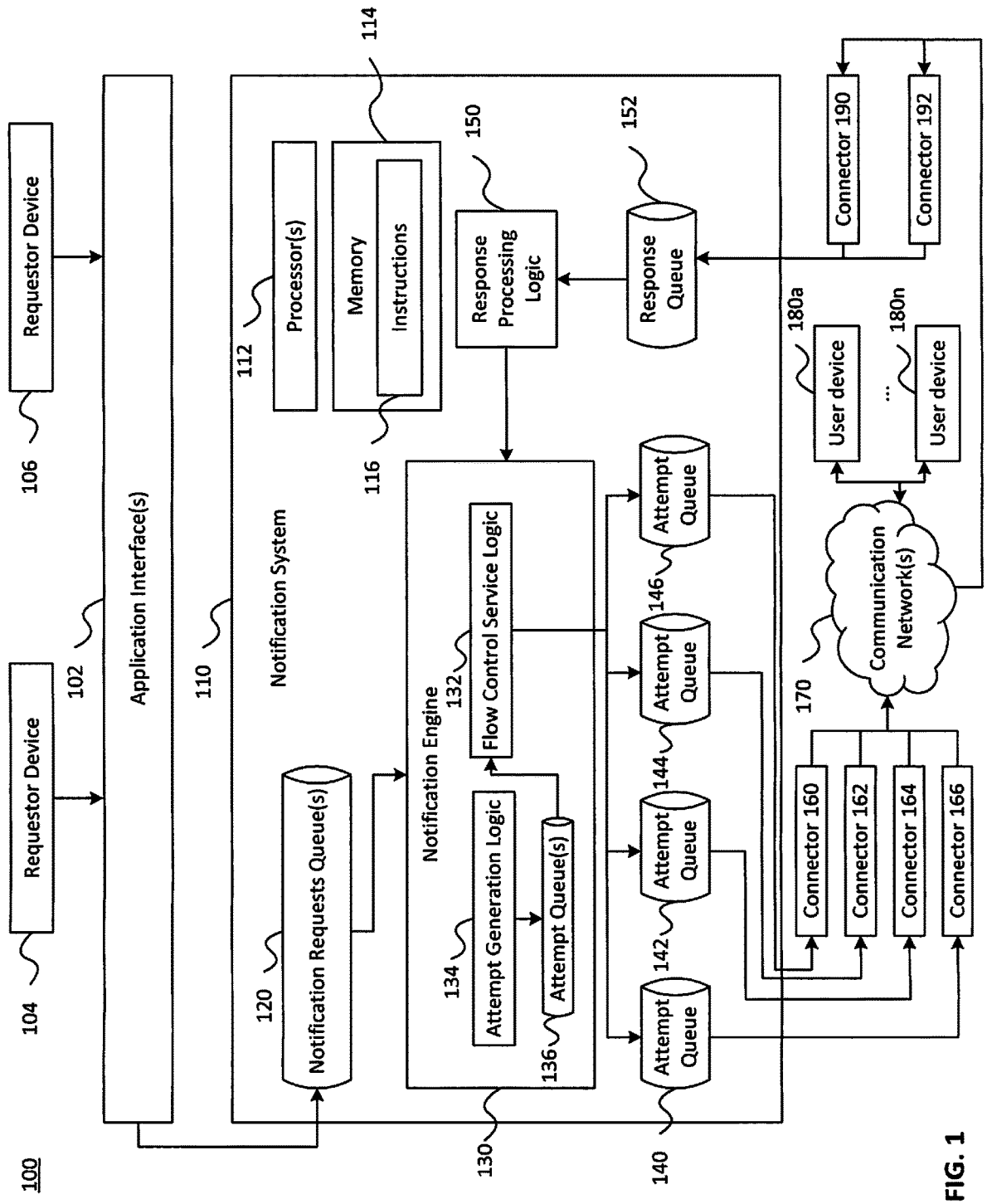
FIG. 1 is a block diagram illustrating aspects of a notification system configured to implement adaptive flow control in accordance with embodiments of the present disclosure.

Referring to FIG. 1, a block diagram illustrating aspects of a notification system configured to implement adaptive flow control in accordance with embodiments of the present disclosure is shown as a system 100. As shown in FIG. 1, the system 100 may include a notification system 110 configured to receive notification requests from one or more requestors via application interface(s) 102 and requestor devices, such as requestor device 104 and requestor device 106. In embodiments, the application interface(s) 102 may be web-based interfaces provided by one or more web pages, or may be graphical user interfaces (GUIs) provided by a standalone application (e.g., an application provided by an operator of the notification system 110 or an application that has been modified to communicate with the notification system 110 via the application interface(s) 102), such as an application executing on the requestor device 104.

The application interface(s) 102 may provide functionality that facilitates configuration of a notification request. For example, a requestor desiring to create a notification broadcast may utilize the application interface(s) 102 to configure one or more parameters of a notification request. The one or more parameters may include at least one of information that identifies one or more intended recipients of the broadcast; information that specifies message content to be included in the broadcast; information that indicates a priority level of the broadcast; information that indicates one or more communication channels for transmitting the broadcast; information that indicates an order in which utilize the one or more communication channels (e.g., where multiple communication channels are identified, the order may indicate that attempts should be transmitted of a first communication channel and if that transmission fails or is otherwise unsuccessful, transmit one or more of the attempts over a second communication channel); workflow information that indicates one or more of: a number of cycles (e.g., how many times should the notification system 110 try to transmit the attempt(s)), how long to wait between switching communication channels or in between cycles; information that indicates whether confirmation is required (e.g., confirmation that attempts of the broadcast were transmitted, received by the intended recipients, whether feedback was received, and the like); or other parameters. In embodiments, the one or more intended recipients may be identified by specifying one or more e-mail addresses, one or more telephone numbers, one or more usernames (e.g., for users that have registered to receive notifications from the notification system 110), or some other information that may be utilized by the notification system 110 to determine the manner in which to provide the broadcast to an intended recipient. Additionally, the notification system 110 may be configured to store and maintain information that may be used to identify intended recipients. For example, the notification system 110 may store and maintain a database of recipients, which may include telephone numbers, e-mail address, usernames, address information, and other information that may be used to identify intended recipients of a broadcast. To illustrate, a requestor may configure a notification request and specify that the intended recipients of the associated broadcast are all residents within a particular zip code. The notification system 110 may be configured to access the information stored in the database to identify a pool of intended recipients for the broadcast, such by matching the zip code specified by the requestor with recipient address information stored in the database.

The message content to be included in the broadcast may include text information, graphical information, audio content, such as pre-recorded audio, video content, a universal resource locator (URL), a telephone number, other information that may be used to provide information to a recipient of the broadcast, or a combination thereof. For example, where text is utilized, the broadcast may include a message that describes an event that is the subject of the broadcast, such as information describing a location of a weather event (e.g., a tornado sighting, a wildfire, a flooded road, and the like). Where graphical information is included, the broadcast may include one or more images, video content, audio content, or a combination thereof. For example, the broadcast may include a map showing a location of the event described in a broadcast. When a URL is provided in a broadcast, the URL may provide link to a website or a page of a website where the recipient can obtain information about the event. For example, when the event is associated with an upcoming concert, the URL may provide a link to a website that describes the location of the concert, a list of bands that are playing at the concert, and other information (e.g., information on how to purchase tickets to the concert and the like). When a telephone number is included in the broadcast, the recipient may call the telephone number to obtain information about the event that is the subject of the broadcast. For example, the requestor may create an automated voice response (AVR) system message designed to communicate information to the user, and the user may access the AVR message by calling the telephone number included in the broadcast. One scenario where these types of broadcasts may occur is customer satisfaction surveys, where a merchant creates an AVR message that asks the recipient for information about a recent experience the recipient had with the merchant. The recipient may interact with the AVR message, such as to provide feedback to the merchant, via inputs provided through selection of one or more keys on the recipients communication device (e.g., a standard telephone device coupled to a public switched telephone network (PSTN), a smart phone, a cellular phone, a tablet computing device, or some other computing capable of accessing an AVR message, such as a voice over Internet protocol (VoIP) enabled device).

It is noted that broadcasts other than ones including a telephone number linked to an AVR message may also be configured to receive inputs from the recipient. For example, a text-based broadcast may be transmitted to a recipient as a short messaging service (SMS) message, and the recipient may reply to the SMS message to provide feedback to the notification system 110, as described in more detail below. Additionally, a broadcast including a URL that links the recipient to a webpage may include a form that the recipient can fill out to provide information to the notification system 110. Further, it is noted that the particular types of messages and feedback mechanisms described above have been provided for purposes of illustration, rather than by way of limitation, and notification systems in accordance with the present disclosure may be configured to utilize other types of messages and feedback mechanisms, or a combination of different messages and feedback mechanisms depending on the needs of a particular broadcast.

In accordance with the present disclosure, notification systems, such as the notification system 110, may be configured to utilize multiple priority levels, such as a high priority level for broadcasts that are expected to be transmitted to and received by the intended recipients immediately (e.g., as fast as the notifications can be generated and sent by the notification system and any intermediate networks used to transport the notifications from the notification system to the intended recipients), and a normal priority level for notifications that are expected to be communicated to and received by the intended recipients quickly, but not necessarily immediately (e.g., some delay is tolerable). It is noted that some embodiments may be configured to utilize more than two priority levels, such as a high priority level, a low priority level, and a normal priority level.

As shown in FIG. 1, the notification system 110 may include one or more processors 112 and a memory 114. The memory 114 may store instructions 116 that, when executed by the one or more processors 112, cause the one or more processors 112 to perform the operations for facilitating configuration of notification requests and for generating one or more broadcasts based on received notification requests, as described herein with respect to FIGS. 1-7. Although not shown in FIG. 1 for purposes of simplifying the drawing, the memory 114 may also store one or more databases, such as the aforementioned database of recipient information. Additional types of databases that may be stored at memory 114 may include information regarding historical usage of the notification system; status information associated with notification request processing (e.g., information that identifies which received notification requests have been assigned to a notification engine for processing and which notification requests remain unassigned, information that identifies which attempts have been generated for each notification request being actively processed by a notification engine, which attempts have been transmitted, and the like); results information that indicates whether particular recipients have received transmitted attempts and/or whether any feedback has been received from one or more recipients; notification request control settings (e.g., settings for formatting attempts, such as configuring headers and footers, fonts, font sizes, background images or colors, and the like); audio data (e.g., prompts and other audio recordings), such as may be utilized for AVR attempts; or a combination of these types of information. It is noted that the exemplary types of information described above have been provided for purposes of illustration, rather than by way of limitation, and that the notification system 110 may utilize other types of information to facilitate its operations. Further, it is noted that the exemplary types of information described above may be stored in a plurality of different databases[. In embodiments, one or more of the databases utilized by the notification system 110 may be stored on at a network attached storage (NAS) device or another type of network accessible memory (e.g., a database maintained by a database server (not shown in FIG. 1 to simplify the drawing) communicatively coupled to the notification system 110).

The notification system 110 may be configured to establish one or more notification request queues 120. As described in more detail below, as notification requests are received by the notification system 110, they may be assigned to the one or more notification request queues 120. Notification requests assigned to the one or more notification request queues 120 may be subsequently retrieved for processing (e.g., expansion of the notification request into a broadcast including one or more attempts) by one or more notification engines 130.

In an embodiment, the notification request queues may be establishing using a centralized approach, where all notification requests are received and queued at a central location (e.g., at a single server or one or more agents running on a server and/or a cloud-based system to receive all notification requests for the notification system 110). Additionally or alternatively, a decentralized approach may be utilized. For example, the notification system 110 may utilize geographically distributed servers and/or agents running on a server or cloud-based system to receive notification requests, and these notification requests may be placed into notification request queues that more closely approximate the target area for distribution of the broadcasts. In another example, notification requests may be received at a central location (e.g., a centralized server) where they are analyzed to identify one or more target areas for distribution of broadcasts, and then, based on the analysis, assigned to one or more notification request queues that approximate the target area for distribution. In this example, it is possible that a notification request can be queued at multiple locations, such as where a notification request identifies target areas for distribution corresponding to a plurality of geographic areas (e.g., a portion of the notification request may be queued in each of the plurality of geographic areas).

Figure 4:
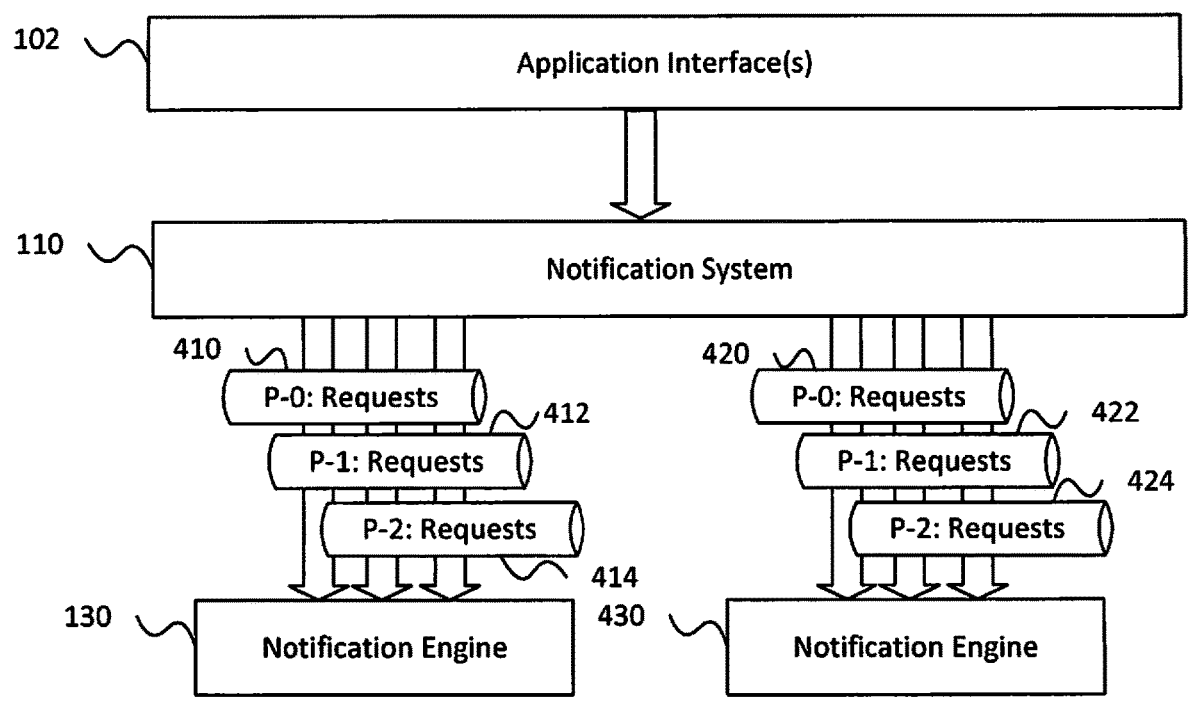
FIG. 4 is a block diagram illustrating aspects of implementing adaptive flow control at the notification request level.

As shown in FIG. 1, a notification engine 130 may include flow control service logic 132 and attempt generation logic 134. It is noted that although the FIG. 1 shows a single notification engine, embodiments of the present disclosure may utilize a plurality of notification engines, as illustrated in FIG. 4. As described herein, notification engines, such as the notification engine 130, may be configured to implement various adaptive flow control techniques to more efficiently handle processing of notification requests. For example, where the notification system 110 utilizes multiple priority levels, the notification system 110 may assign one or more different notification engines to each different priority level, thereby enabling notifications of all priority levels to be processed by the notification system in accordance with an expected level or quality of service. For example, a first notification engine may be dedicated to processing only notifications for a highest priority level, while a second notification engine may be dedicated to processing notifications for two or more lower priority levels. In such an arrangement, each notification engine may be assigned to process notification requests for only their associated priority level(s). However, such an implementation may provide decreased performance and/or underutilization of a notification engine if a quantity of notification requests for a particular priority level is low. If this occurs, the notification engine assigned to the priority level experiencing a low volume of notification requests may be tasked with processing notification requests for an additional priority level to maintain the notification engine at a desired utilization.

In embodiments, adaptive flow control techniques may be configured to apply a set of weights to the different priority levels utilized by the notification system 110, where the set of weights may be utilized to determine which priority levels to process notifications for or how many notifications from each different priority level the notification system should process during a particular transmission period. For example, assume that the notification system uses four priority levels, with level one corresponding the most urgent priority level and level four corresponding to the least urgent priority level. Assume also that priority level one is assigned a first weight (e.g., A), priority level two is assigned a second weight (e.g., B), priority level three is assigned a third weight (e.g., C), and priority level 4 is assigned a fourth weight (e.g., D), where A+B+C+D is a metric representative of the notification engine's notification generation and transmission capacity, or some other notification processing metric (e.g., a percentage of processing resources allocated to notifications of the different priority levels, an allocation of time within a notification processing and transmission period for processing and transmitting notifications for each priority level, etc.). The notification engine may select notification requests from the notification request queue for each priority level and process them based on the set of weights.

For example, assume A=50%, B=25%, C=15%, and D=10%, with percentages representing a percentage of total notification processing capacity (e.g., generation and transmission) for the notification engine 130. If the total notification processing for the notification engine 130 was 1000 messages per notification processing and transmission period, the notification engine 130 may process (e.g., generate and transmit) 500 notifications for the first priority level, 250 notifications for the second priority level, 150 notifications for the third priority level, and 100 notifications for the lowest priority level. It is noted that any unused capacity may be reallocated to process notifications for one or more of the other priority levels. For example, if the notification engine only has 50 notifications for the fourth priority level, 5% of the total notification processing for the notification engine 130 may be reallocated to one or more of the other priority levels. In an embodiment, adaptive flow control techniques of the present disclosure may be configured to always allocate additional capacity to the highest priority level first, and then any capacity remaining may be distributed to lower priority levels until all capacity is utilized. By processing notifications for all priority levels in parallel, the likelihood that any particular notification or priority level suffers from starvation may be reduced or eliminated.

As described in more detail below with respect to FIGS. 5 and 6, the flow control service logic 132 may be configured to implement adaptive flow control techniques with respect to processing of notification requests retrieved from the one or more notification request queues 120. The attempt generation logic 134 may be configured to retrieve one or more notification requests from the one or more notification request queues 120, and to expand the retrieved one or more notification requests into broadcasts that include one or more attempts (e.g., messages intended for transmission to one or more recipients. In an embodiment, the attempt generation logic 134 may be configured to generate attempts for retrieved notification request based on information included in each retrieved notification request. For example, a notification request may identify intended recipients using one or more telephone numbers, and may indicate the broadcast is to be generated as a plurality of SMS attempts. Based on this information, the attempt generation logic 134 may generate a plurality of attempts, each attempt may be an SMS message configured for transmission to one of the intended recipients and may include the content specified for inclusion in the broadcast.

In embodiments, a notification request may include parameters for transmitting an attempt via one or more secondary channels of communication. For example, a primary channel may be specified as an SMS message, and a secondary channel may specify an AVR message. In such a scenario, the attempt generation logic 134 may generate a plurality of SMS messages for transmission to the intended recipient(s) identified by the notification request, and may generate a plurality of additional attempts that include telephone numbers for accessing the AVR message. If transmission of an attempt to an intended recipient fails or is otherwise unable to be confirmed by the notification system 110 as having been received, the second attempt for the intended recipient may be transmitted over the secondary channel in an effort to ensure that the intended recipient receives the notification. It is noted that although the description above indicates that notification requests may be configured to specify a primary channel for transmitting attempts to recipients and a secondary channel for transmitting the attempts to the intended recipients, embodiments are not limited to a primary channel and a secondary channel for transmitting attempts. For example, notification requests may be specify a single channel for delivering an attempt to an intended recipient, or may specific two or more channels for delivering an attempt to an intended recipient. Further, it is noted that primary and secondary channels for transmitting attempts to intended recipients may utilize different primary channels and/or different secondary (or tertiary, etc.) channels for different intended recipients. In embodiments, the particular channels selected as the primary channel and the secondary (or tertiary, etc.) channels may be specified in the notification request or determined based on information stored in a database accessible to the notification system 110.

As the attempts are generated by the attempt generation logic 134, they may be placed in one or more attempt queues 136. The flow control service logic 132 may be configured to selected attempts from among the one or more attempt queues 136 and assign the selected attempts to different connector-specific attempt queues 140, 142, 144, 146. The flow control services logic 132 may be configured to implement adaptive flow control with respect to the attempts generated by the attempt generation logic 134. For example, the flow control service logic 132 may be configured with a set of rules configured to operate as a series of virtual valves that control the flow of attempts from particular attempt queues to a particular connector-specific attempt queue. For example, as shown in FIG. 1, the notification system 110 may include a first attempt queue 140, a second attempt queue 142, a third attempt queue 144, and a fourth attempt queue 146. As described in more detail below with reference to FIGS. 2-6, in embodiments the flow control service logic 132 may be configured with a set of rules that govern how attempts are selected form the attempts queues 136 and assigned to various ones of the attempt queues 140, 142, 144, 146. The set of rules may be configured to ensure that broadcasts associated with various received notification requests are processed in a manner that provides fairness to different broadcasts, mitigates occurrences of starvation, and other improvements to the overall way in which attempts are generated and transmitted by the notification system 110. For example, as described with reference to FIG. 5 below, the set of rules may implement processing logic that functions to control how attempts, once generated, selected from the attempt queues 136 and placed into one of the attempt queues 140, 142, 144, 146, which may include implementing one or more throttling schemes, as described in detail below with reference to FIG. 6.

Once attempts have been created an assigned to the appropriate attempt queue (e.g., one of the attempt queues 140, 142, 144, 146), various ones of the connectors 160, 162, 164, 166 may begin processing attempts from the corresponding one of the attempt queues 140, 142, 144, 146 to transmit attempts associated with one or more broadcasts. As described above, each of the attempt queues 140, 142, 144, 146 may be associated with a particular connector (e.g., one of the connectors 160, 162, 164, 166). For example, as shown in FIG. 1, the attempt queue 140 may correspond to the connector 166, the attempt queue 142 may correspond to the connector 164, the attempt queue 144 may correspond to the connector 162, and the attempt queue 146 may correspond to the connector 160. Each of the connectors 160, 162, 164, 166 may provide a different communication channel configured to communicatively couple the notification system 110 to a different communication network 170 and/or a mechanism for implementing transmission of a particular type of attempt. For example, the connector 160 may be configured to communicatively couple the notification system 110 to a cellular communication network, which may facilitate transmission of attempts comprising one or more SMS messages via the cellular communication network; the connector 162 may be configured to communicatively couple the notification system 110 to an e-mail server, which may facilitate transmission of attempts comprising one or more e-mail messages via the Internet; and the connector 164 may be configured to communicatively couple the notification system to a telecommunications network (e.g., the PSTN), which may facilitate transmission of attempts comprising one or more AVR messages.

In an embodiment, multiple ones of the connectors may communicatively couple the notification system 110 to similar networks and/or mechanisms for implementing transmission of a particular type of attempt. For example, the connector 166 may also communicatively couple the notification system 110 to a cellular communication network, which may facilitate transmission of attempts comprising one or more SMS messages via the cellular communication network. It is noted that the connector 166 may communicatively couple the notification system to a first cellular communication provider and the connector 160 may communicatively couple the notification system 110 to a second cellular communication provider. Additionally or alternatively, multiple connectors of the same type may be utilized to facilitate load balancing for particular types of attempts. Having multiple connectors for communicatively coupling the notification system 110 to particular type of network infrastructure (e.g., a cellular communication network, one or more e-mail servers, and the like) may enable the notification system 110 to handle larger quantities of attempts of a particular type (e.g., SMS messages, MMS messages, e-mails, AVR calls, and the like). For example, this may prevent a single type of attempt from becoming bottlenecked when large quantities of attempts are to be transmitted via certain types of network infrastructure.

As the attempts are transmitted via the connectors 160, 162, 164, 166 via the communication network(s) 170, they may be received by various user devices 180a through 180n. As illustrated in FIG. 1, at least a portion of the attempts may be configured to prompt the recipient for feedback. In an embodiment, feedback may be received at the notification system 110. The notification system 110 may include one or more inbound connectors 190, 192 which may be utilized to receive feedback. For example, the connector 190 may communicatively couple the notification system 110 to an e-mail server configured to receive feedback in the form of one or more e-mail messages. The response processing logic 150 may be configured to analyze feedback in the received e-mail messages and provide the feedback to the notification system 110 in a format that is compatible with the notification system 110. It is noted that although FIG. 1 only shows two inbound connectors, the notification system 110 may utilize a single inbound connector or may utilize more than two inbound connectors in accordance with embodiments of the present disclosure.

As feedback is received, the inbound connectors 190, 192 may assign the feedback to a response queue 152. The response queue 152 may store the feedback for subsequent processing by response processing logic 150 of the notification system 110. It is noted that although FIG. 1 only shows one response queue, the notification system 110 may include two or more response queues in accordance with embodiments of the present disclosure. For example, response queues may be established for each different priority level utilized by the system, and in some instances established for broadcasts of a particular size, such as for "large" broadcasts. The response processing logic 150 may be configured to utilize the received feedback to control or configure various aspects of the operations of the notification engine 130. For example, where a notification specifies a primary channel for transmitting attempts to one or more recipients and a secondary channel for transmitting the attempts to the one or more recipients (e.g., when the primary channel fails to successfully deliver the attempt to the recipient), the response processing logic 150 may be configured to determine whether a particular attempt was successfully received and cancel transmission of successfully received attempts via one or more secondary communication channels. Thus, where an attempt (e.g., an SMS message) was successfully transmitted on a first communication channel (e.g., via a cellular communication network), the response processing logic 150 may cancel transmission of the attempt on one or more secondary communication channels (e.g., cancelling transmission of an e-mail message, and AVR messages, etc.). Additionally it is noted that in some instances feedback associated with a particular attempt may be received from a device or system other than an intended recipient device. For example, where an attempt is transmitted as an e-mail message, but the e-mail address provided to the notification system 110 was incorrect or no longer active, the notification system 110 may receive feedback from an e-mail server, such as a message indicating that the e-mail address is incorrect or no longer an active or valid e-mail account. Thus, in some situations, the feedback received by the notification system 110 may not be generated by the intended recipient and may instead be generated by some intermediate system.

The notification system 110 may also be configured to implement adaptive flow control techniques with respect to response messages, such as by establishing a plurality of response queues. This may be advantageous in situations where a broadcast is likely to create a large number of feedback messages. For example, establishing a separate response queue for a broadcast that is likely to create a large number of feedback messages may prevent the large number of response messages generated for that broadcast from delaying processing of feedback responses for other broadcasts. In this manner, large broadcasts that generate a large number of feedback responses will not starve or unreasonably delay processing of feedback responses generated by smaller broadcasts.

In an embodiment, the notification system 110 may further implement various back pressure processes to respond to excess loading conditions. For example, the system may detect when the system is becoming overloaded, and allow downstream components to send back pressure signaling or messages to upstream components (e.g., components that are generating load), where the back pressure signaling or messages request that one or more work upstream components slow down activities that are created a load at the downstream components. Back-pressure may be used to control flow at three levels.

At a first level, back pressure signaling may be used to slow or stop the rate at which notification requests are selected by a notification engine for processing. This allows the notification engine to be self-limiting, so that it will not take on more work than it is capable of processing in a timely fashion. One issue with this approach is that the granularity may be too coarse. This could be a problem, for example, if the notification engine is close to its maximum capacity and gets another request for a large notification. This leads to the second back-pressure mechanism:

At a second level, back pressure signaling may be used to slow or stop the rate at which attempts are generated from a notification. This is typically used when the number of queued messages waiting to be processed has grown too large, and permits the notification engine to work through its backlog of attempts.

At a third level, back pressure signaling may be used to slow or stop the rate at which the notification system schedules notifications for one of the notification engines. This is critical in conjunction with the first approach, to ensure that notifications aren't unduly delayed.

As shown above, the system 100 provides a notification system that is configured to implement various adaptive flow control techniques that improve the way that broadcasts and attempts are processed. It is noted that the particular examples described above with respect to FIG. 1 have been provided for purposes of illustration, rather than by way of limitation. Additionally, while several advantageous aspects of adaptive flow control techniques in accordance with embodiments of the present disclosure have been described above, additional details and advantages of adaptive flow control techniques that may be implemented by the notification system 110 in accordance with the present disclosure are described below with reference to FIGS. 2-7.

Figure 2:
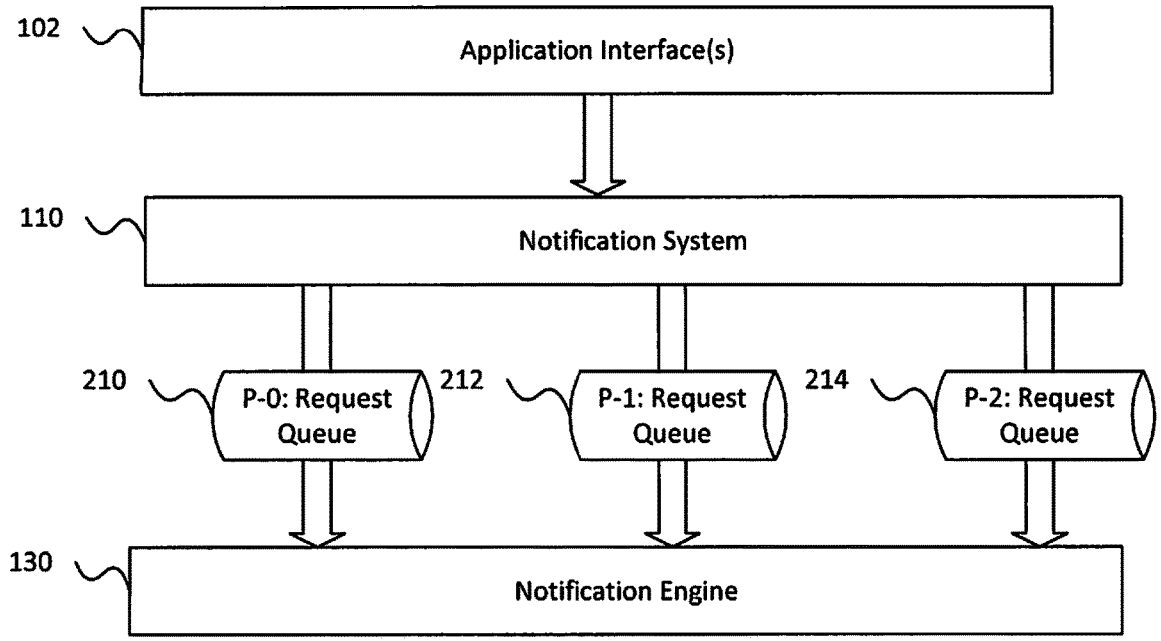
FIG. 2 is a block diagram illustrating aspects of implementing adaptive flow control at the notification request level.

Referring to FIG. 2, a block diagram illustrating aspects of implementing adaptive flow control at the notification request level is shown. As described above with reference to FIG. 1, the notification system 110 may receive notification requests from one or more requestor devices (e.g., the requestor devices 104, 106 of FIG. 1). As described above with reference to FIG. 1, as notification requests are received by the notification system 110, the notification requests may be assigned to one or more notification request queues. In embodiments, the notification system 110 may be configured to implement adaptive flow control with respect to notification requests based on priority levels of the received notification requests.

In the scenario of FIG. 2, the notification system 110 is configured to utilize three priority levels including a first priority level (P-0), a second priority level (P-1), and a third priority level (P-2). The first priority level (P-0) may correspond to a high priority level, the second priority level (P-1) may correspond to a low priority level, and the third priority level (P-2) may correspond to a normal priority level. As shown in FIG. 2, the notification system 110 may implement adaptive flow control at the notification request level by establishing a separate notification requests queue for each priority level. This is illustrated in FIG. 2 where the notification system 110 has established a first request queue 210 corresponding to the first priority level (P-0), a second request queue 212 corresponding to the second priority level (P-1), and a third request queue 214 corresponding to the third priority level (P-2). As the notification requests are received by the notification system 110 from the application interfaces 102, the notification system 110 may analyze one or more parameters associated with the received notification requests to determine a priority level of each received notification request and then assign the notification requests to the notification request queue according to the priority level of each received notification request. For example, the notification system 110 may assign high priority (P-0) notification requests to the first notification request queue 210, low priority (P-1) notification requests to the second notification request queue 212, and normal priority (P-2) notification requests to the third notification request queue 214.

As described above, the notification engine 130 may retrieve notification requests from the notification request queue(s) for further processing, such as expanding the notification requests into a broadcast that includes a plurality of attempts and the allocating those attempts to one or more attempt queues for further processing, such as transmission of the queued attempts by one or more connectors. Allocating or assigning notification requests to separate queues based on the priority levels of the notification requests may enable the notification engine 130 to implement dynamic flow control during processing notification requests in a manner that provides fairness to all priority levels while ensuring that each notification requests is handled in a manner commensurate with the corresponding priority level. For example, the notification engine 130 may be configured to execute a set of rules (e.g., the flow control service logic 132 of FIG. 1) against the notification request queues 210, 212, 214 to select and process notification requests. In an embodiment, the set of rules may be configured to apply a set of weights to notification requests retrieved from the notification request queues 210, 212, 214. The weights may reflect the relative importance (e.g., priority level) of the notification requests, and applying the set of weights to notification requests retrieved from the notification queues 210, 212, 214 may determine a quantity of processing resources allocated for processing the notification requests.

For example, the notification engine 130 may retrieve a set of notification requests from the notification queues 210, 212, 214. The set of notification requests may include a one or more high priority (P-0) notification requests retrieved from the first notification request queue 210, one or more low priority (P-1) notification requests retrieved from the second notification request queue 212, and one or more normal priority (P-2) notification requests retrieved from the third notification request queue 214. After retrieving the set of notification requests, the notification engine may execute the set of rules against a set of notification requests to determine an allocation of resources for processing the set of notification requests. The set of rules may be configured to apply a set of weights to the set of notification requests such that the resources allocated for processing notifications corresponding to each priority level approximates the relative weights. Implementing adaptive flow control in this manner avoids starvation because notification requests for each priority level are processed in parallel; however, this technique also ensures fairness because the resources allocated for processing each notification request reflect the importance of the broadcasts associated with each notification request.

If the system is under-loaded and all notification requests can be immediately processed, then flow-control is not required and queuing of notification requests may be bypassed (e.g., the notification requests may be provided directly to the notification engine 130 for processing, rather than placed in a notification request queue). However, when the load exceeds the capacity of the notification system 110, requests are assigned to one or more notification request queues in accordance with their priority level for processing, as described above. If the set of rules are configured with a set of relative weights of 4:2:1 for priority levels high, low, and normal, respectively, up to four notification requests may be retrieved for processing from the first notification request queue 210, up to two notification requests will be retrieved for processing from the second queue 212, and one or zero notification requests will be retrieved for processing from the third notification request queue 214. In embodiments, the resources allocated for processing each retrieved notification request across all priority levels may be commensurate with the relative weight associated with each priority level. For example, if a weight of 1 corresponds to a first amount of processing resources, a weight of 2 may correspond to twice the first amount of processing resources, and a weight of 4 may correspond to four times the first amount of processing resources. During processing, the retrieved notification requests are expanded into their respective broadcasts. As processing nears completion, additional processing resources may be freed up, at which point the notification engine 130 may retrieve additional notification requests for processing in accordance with the set of rules and weights. Thus, in embodiments, the weights may dictate not only the amount of processing resources allocated for processing each notification request, but may also indicate the quantity of notification requests that may be retrieved from the corresponding notification request queues.

Figure 3:
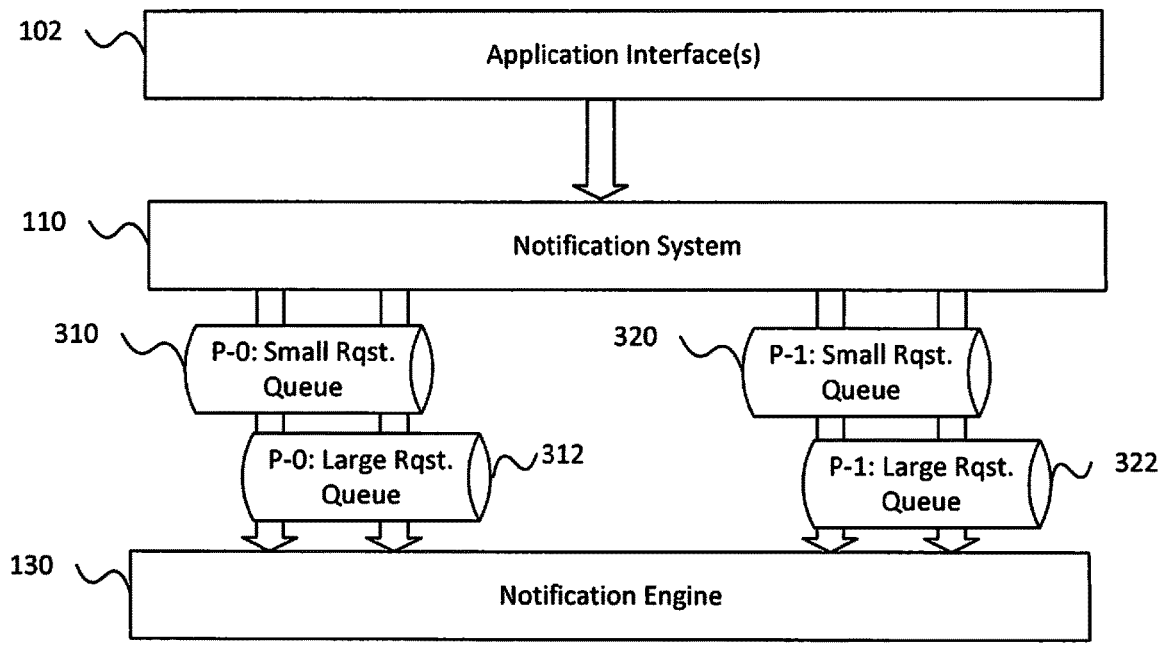
FIG. 3 is a block diagram illustrating aspects of implementing adaptive flow control at the notification request level.

It is noted that utilizing three notification request queue and three different priority levels, as described with respect to FIG. 2, has been provided for purposes of illustration, rather than by way of limitation, and that notification systems in accordance with embodiments may utilize more or less than three notification request queues and more or less than three priority levels. Additionally, it is noted that notification systems of embodiments may implement dynamic flow control at the notification request level based on additional notification request parameters, such as size. For example, as described in more detail below, FIG. 3 illustrates an embodiment of a notification system that implements dynamic flow control at the notification request level based on two priority levels while taking into account notification request size. Further, it is noted that notification systems of embodiments may implement dynamic flow control at the notification request level by implementing different sets of priority-based queues for different notification engines. For example, as described in more detail below, FIG. 4 illustrates an embodiment of a notification system that implements dynamic flow control at the notification request level based on three priority levels, two sets of notification request queues, and two notification engines.

Notification systems of embodiments may be configured to additionally or alternative implement other schemes to provide fairness with respect to processing of notification requests. For example, a notification system of embodiments may also be configured to utilize the set of rules and weights to implement a round robin scheme, whereby the notification engine 130 utilizes the weights for the different priority levels to retrieve up to a certain number of notification requests corresponding to the first priority level for processing before retrieving notification requests corresponding to the next priority level, and so on, and then repeating the process after notification requests for all priority levels have been retrieved. In such an embodiment, the set of rules may be applied to determine the number of notification requests retrieved from each notification request queue for processing. For example, using the weights of 4:2:1 described above, up to four notification requests may be retrieved from the first notification request queue 210, then up to two notification requests may be retrieved from the second notification request queue 212, and then one or zero notification requests may be retrieved from the third notification request queue 214. During processing, the retrieved notification requests are expanded into their respective broadcasts. As processing nears completion, additional processing resources may be freed up, at which point the notification engine 130 may retrieve additional notification requests for processing in accordance with the round robin scheme and the set of rules and weights.

As briefly described above, notification systems in accordance with embodiments of the present disclosure may be configured to implement adaptive flow control at the notification request level based on priority levels, as well as a broadcast size associated with received notification requests. In such embodiments, the broadcast size associated with a received notification request may be computed (or approximated) before the notification requests is assigned to a notification request queue. This may allow the notification system 110 to implement adaptive flow control at the notification request level based not only on the priority level associated with a received notification request, but also on the broadcast size. In an embodiment, the notification system may be configured to adaptively apply weights to received notification requests to decide which requests to process. For example, the weights applied to the different notification request queues may by dynamically adjusted in response to system usage or history, such as adjusting the weights associated with each different notification request queue to account for a lower incidence of notification requests for a particular priority level.

For example and referring to FIG. 3, a block diagram illustrating aspects of implementing adaptive flow control at the notification request level is shown. The notification system 110 illustrated in FIG. 3 is configured to implement adaptive flow control at the notification request level by establishing notification request queues for different notification request priority levels as described above with reference to FIG. 2. However, the notification system 110 of FIG. 3 is further configured to implement adaptive flow control techniques that utilize broadcast size. As shown in FIG. 3, the notification system 110 may establish a first set of notification request queues corresponding to a first priority level (P-0) and a second set of notification request queues corresponding to a second priority level (P-1).

The first set of notification request queues includes a first notification request queue 310 and a second notification request queue 312, and the second set of notification request queues includes a third notification request queue 320 and a fourth notification request queue. The first notification request queue 310 may be configured for small broadcasts corresponding to the first priority level (P-0), the second notification request queue 312 may be configured for large broadcasts corresponding to the first priority level (P-0), the third notification request queue 320 may be configured for small broadcasts corresponding to the second priority level (P-1), and the fourth notification request queue 310 may be configured for large broadcasts corresponding to the second priority level (P-1).

As notification requests are received by the notification system 110 from the application interfaces 102, they may be assigned to one of the notification request queues 310, 312, 320, 322 based on their priority level and broadcast size. In an embodiment, the broadcast size for a received notification request may be calculated (or estimated) before the notification requests is assigned to a notification request queue. For example, during configuration of a notification request via the application interface(s), the entity requesting the notification broadcast may configure one or more parameters that may be used to determine the broadcast size.

As explained above, the application interface(s) may be configured to capture information that identifies intended recipients of the requested broadcast. For example, the notification system 110 may be configured to calculate or estimate the broadcast size based on the information identifying the intended recipients. Where the notification request identifies intended recipients specifically, such as via a list of e-mail addresses, telephone numbers, a list of usernames, pseudo-names, or other types of recipient identifiers, and the like, the size of the broadcast may be calculated based on the number of identified recipients. As another example, the size of the broadcast may be determined based on an estimate of the target recipients. For instance, the notification request may indicate that the broadcast is to be transmitted to all recipients within a particular zip code or other geographic area. In this example, the size of the broadcast may be estimated based on information maintained by the notification system 110, such as information that indicates a number of people that reside in various geographic areas (e.g., by zip code, city, and the like). In yet another example, the application interfaces may enable a user requesting a broadcast to configure a size parameter during configuration of the notification request, and the value of the size parameter may be utilized to determine the size of the broadcast. As describe above with reference to FIG. 2, a set of rules and weights may be applied against the different notification request queues 310, 312, 320, 322 to select notification requests for further processing.

The techniques described above for determining the size of broadcasts may be considered "static" sizing approaches. Adaptive flow control techniques of embodiments configured to utilize broadcast size information may improve processing of notifications. For example, separating large and small broadcasts prevents large broadcasts from blocking smaller broadcasts, which could result in starvation of smaller broadcasts and/or unreasonable delays in processing small broadcasts. By assigning different sized broadcasts into separate notification request queues, the notification system 110 can select large and small broadcasts for processing in a dynamic manner (e.g., by applying the set of rules described above) which reduces the likelihood that large broadcasts block smaller broadcasts. Additionally, allocating notification requests to different queues based both on size and priority may prevent large broadcasts of a particular priority level from blocking smaller broadcasts of same priority level, which may improve the processing of notification requests and ensure that each notification request is handled in a fair and efficient manner.

It is noted that notification systems in accordance with embodiments of the present disclosure are not limited to utilizing "static" techniques to specify or determine broadcast size. As another example, the notification system 110 of embodiments may be additionally or alternatively configured to dynamically determine the size of a broadcast using a dynamic and adaptive sizing approach. To facilitate dynamic sizing, the notification system 110 may be configured to initially categorize all broadcasts corresponding to received notification requests as "small" broadcasts. As the notifications are processed and attempts are generated, the notification system 110 may be configured to keep a count of how many attempts have been generated and sent. The notification system 110 may be configured to determine whether the count exceeds a dynamic broadcast sizing threshold, and, when the dynamic broadcast sizing threshold is exceeded, the notification system 110 may mark the broadcast as a "large" broadcast and establish an attempt queue dedicated to the large broadcast. Once this occurs, subsequently generated attempts for the large broadcast may be assigned to the attempt queue dedicated to the large broadcast. Applying this approach to the embodiment illustrated in FIG. 2, the notification system 110 may initially establish two notification request queues, such as the first notification request queue 310 and the third notification request queue 320. As notification requests are processed from these notification queues, the system may monitor the expansion of these notification requests into attempts and upon determining that one of the notification requests processed from the first notification request queue 310 exceeds the dynamic broadcast sizing threshold, may establish the second notification request queue 312 and/or one or more additional queues, such as an attempt queue in which attempts generated for the newly identified large broadcast are assigned for further processing (e.g., for subsequent transmission using one or more connectors and/or channels).

Implementing dynamic sizing technique may provide a dynamic fairness scheme. For example, the notification system may initially utilize a single queue for each priority level and may dynamically generate additional queues as large broadcasts are identified to prevent the large broadcasts from starving and/or delaying transmission of attempts corresponding to smaller broadcasts. For example, a large broadcast will generate a large number of attempts compared to small broadcasts. As the attempts are generated, they are placed into an attempt queue. If large broadcasts were not identified and moved to separate queues, attempts generated for the small broadcast may experience starvation and/or delays in transmission because the attempt queue may contain a lot more attempts for the large broadcast than for the small broadcast, which creates a scenario where only a small number of attempts are retrieved for transmission each time the attempt queue is accessed. Thus, by identifying large broadcasts and then establishing a new queue to handle the attempts generated for that large broadcast, the notification system 110 is capable of ensuring that smaller broadcasts are not starved, such as by implementing a weighting scheme that ensures up to a threshold quantity of attempts are processed from the small broadcast attempt queue during each processing cycle.

The dynamic sizing approach also provides improved resource utilization, such as in a cloud-based deployment of the notification system 110. For example, because additional queues are only established as large broadcasts are identified, the notification system 110 may be operated at some minimum threshold level of resources (e.g., an amount of resources necessary to process small broadcasts) and may dynamically bring additional resources online as needed, such as when large broadcasts are identified and additional queues need to be established. Once these large broadcasts have been processed, those resources may be released or taken offline or reallocated to other system processes and/or to other identified large broadcasts. In this manner, the dynamic sizing approach enables the notification system 110 to dynamically manage resources, bringing resources online as necessary and then releasing those resources when they are no longer needed, which improves resource utilization and may reduce the costs associated with operating the notification system 110.

In an embodiment, the notification system 110 may be configured to keep multiple counts for a single notification request. For example, a notification request may identify several channels or delivery paths (e.g., channels and/or delivery paths for SMS messages, e-mail messages, AVR system messages, and the like) over which attempts are to be provided to the recipients intended to receive the broadcast, and the notification system may keep a count of how many attempts have been generated and sent on each channel or delivery path. As attempts are generated for each channel or delivery path the notification system 110 may determine whether the count on each channel exceeds the dynamic broadcast sizing threshold, and when a number of attempts generated for a particular channel or delivery path exceeds the dynamic broadcast sizing threshold, an individual queue may set up for the notification request and for the particular channel or delivery path. Subsequent attempts generated for that notification request on that channel or delivery path will be sent to the newly created queue. This provides the further advantage that attempts can be managed on a per channel or delivery path level for a single broadcast. In this manner, the notification system may manage processing of notification requests more efficiently by establishing separate queues only for channels or delivery paths on which a significant number of attempts are to be generated. Thus, where a notification request results in a large number of attempts on one or more channels or delivery paths (e.g., for delivering a large number of e-mail messages) and a small number of attempts on other channels or delivery paths (e.g., for delivering SMS messages), additional queues are only established for the channels or delivery paths over which a large number of attempts are to be processed, and channels or delivery paths over which a small number of attempts are to be processed may be processed from the initial queue (e.g., the initial queue established for processing small notification requests).

Additionally, by accounting for channel or delivery paths over which attempts are to be transmitted, more efficient utilization of connector resources may also be realized. For example, a large broadcast may be configured for multiple channels or delivery paths, however, some of those channels or delivery paths may be rarely used, such as when the notification requests identifies a primary channel or delivery path for delivering an attempt to the intended recipients and one or more secondary channels or delivery paths for delivering an attempt if the primary channel or delivery path fails. Because additional queues are only established as attempts are generated for each channel or delivery path, additional queues for secondary channels or delivery paths are not created until the notification system 110 has determined that the count of attempts on a particular channel or delivery path is significant (e.g., exceeds the dynamic broadcast sizing threshold), resources for some channels or delivery paths may be more efficiently utilized to handle attempts for small notification requests, but may be dynamically reallocated as large broadcasts on those channels or delivery paths as needed.

As shown above, implementing techniques for dynamically determining the size of notification requests provides several mechanisms through which the notification system is enabled to manage processing of notification requests and attempts at a fine level of granularity, providing improved control over how system resources are utilized. It is noted that the exemplary techniques for determining broadcast size described above have been provided for purposes of illustration, rather than by way of limitation and that notification systems of embodiments may utilize other techniques for determining broadcast size. Additionally, it is noted that the notification system 110 may be configured to dynamically modify various parameters for processing notification requests and/or attempts based on broadcast size estimates. For example, as explained above, where dynamic sizing techniques are implemented, the notification system 110 may initial process all notification requests from an initial set of notification request queues. The notification system 110 may be initially configured to handle processing requests according to a first set of rules and weights, such as allocating "x" percent of processing resource capacity to processing notification requests and/or attempts associated with a first priority level (P-0) and "y" percent of processing resource to processing notification requests and/or attempts associated with a second priority level (P-1). As large broadcasts are identified and additional queues are established, the notification system 110 may be configured to adjust the configuration of the set of rules and weights to allocate processing resource capacity to the dynamically identified large broadcasts.

Referring to FIG. 4, a block diagram illustrating aspects of implementing adaptive flow control at the notification request level is shown. In an embodiment, the notification system 110 that utilizes multiple notification engines. For example, as shown in FIG. 4, the notification system 110 may include the notification engine 130 and a notification engine 430. The notification system 110 may establish one or more notification request queues for each of the notification engines 130, 430, and the notification engines 130, 430 may select notification requests for expansion and processing from their respective queues. In the exemplary embodiments illustrated in FIG. 4, the notification engine 130 may include a first notification request queue 410, a second notification request queue 412, and a third notification request queue 414, and the second notification engine 430 may include a first notification request queue 420, a second notification request queue 422, and a third notification request queue 424. In an embodiment, the notification request queues established for each of the notification engines 130, 430 may be associated with different priority levels. For example, the first notification request queues 410, 420 may be associated with a first priority level (P-0), the second notification request queues 412, 422 may be associated with a second priority level (P-1), and the third notification request queues 414, 424 may be associated with a third priority level (P-2), similar to the embodiment described above with reference to FIG. 2.

It is noted that illustrating three priority levels and three notification request queues for each notification engine has been provided for purposes of illustration, rather than by way of limitation and that embodiments utilizing multiple notification engines may be implemented with more or less than three notification request queues and/or more or less than three priority levels. Additionally, it is noted that different notification engines may have different quantities of notification request queues in some embodiments. For example, the notification engine 130 may be configured to utilize three notification request queues while the notification engine 430 may be configured to utilize less than or more than three notification request queues. Thus, in embodiments where multiple notification engines are implemented, the number of notification request queues established by the notification engine 110 may be the same across all notification engines, or may be different for particular notification engines. Additionally, embodiments implementing multiple notification engines may further utilize static and/or dynamic sizing techniques, such as the techniques described above with reference to FIG. 3, to manage notification request queues and/or attempt queues. For example, notification request queues may be statically or dynamically established for different sizes of notification requests in connection with one or more notification engines, as described above with reference to FIG. 3.

As notification requests are received, the notification system 110 may assign the received notification requests to notification request queues established for one or more notification engines. In embodiments, the notification system 110 may assign the received notification requests to particular notification request queues corresponding to particular notification engines to provide load balancing, for example. Additionally, the notification system 110 may be configured to analyze the notification request to identify metrics associated with the notification request, such as to identify one or more metrics associated with intended recipients of each requests broadcast (e.g., each requested notification), and may assign all or a portion of a notification request to notification request queues based on the metrics. For example, where the notification request identifies a first group of intended recipients corresponding to a first geographic area and a second group of intended recipients corresponding to a second geographic area, the notification system 110 may allocate a first portion of the notification request corresponding to the first group of intended recipients to one of the notification request queues established for the notification engine 130 and a second portion of the notification request corresponding to the second group of intended recipients to one of the notification request queues established for the notification engine 430. By assigning notification requests in this manner, the notification system 110 may realize improved performance. For example, the notification system 110 may be configured to instantiate instances of notification engines at different geographic locations or using processing resources that are more geographically proximate to particular geographic locations. In such an arrangement, the notification engine 130 may be deployed or instantiated in a manner that enables the notification engine 130 to provide improved performance with respect to processing notification requests to transmit broadcasts to recipients in the first geographic location and the notification engine 430 may be and the notification engine 430 deployed or instantiated in a manner that enables the notification engine 430 to provide improved performance with respect to processing notification requests to transmit broadcasts to recipients in the second geographic location. By allocating the first portion of the notification request to the queue of the notification engine 130 and the second portion of the notification request to the queue of the notification engine 430, the broadcasts may be processed in a more efficient manner, resulting in improved transmission and processing of the notification request.

Other types of metrics upon which the notification system may assign notification request to queues of different notification engines may also be utilized. For example, a round robin scheme may be used, where a first notification request is assigned to a queue of the notification engine 130, a second notification request is assigned to a queue of the notification engine 430, and so on. However, such techniques may result in imbalances if the notification system 110 does not take other factors into account. For example, if the notification system receives a small notification request, followed by a large notification request, followed by another small notification request and then another large notification request, and so on, the simple round robin approach may end up assigning a large number of small notification requests to the notification engine 130 and a large number of large notification requests to the notification engine 430, resulting in a load imbalance. To avoid this, the notification system 110 may utilize dynamic load balancing techniques, which may account for notification request size, geographic considerations, load of the notification engines, and the like to provide a more even distribution of notification requests among the different notification engines. Where different notification request queues are utilized for different sizes of notification requests, the notification system may further account for a quantity of queued notification requests of a particular size when determining which queue and which notification engine a particular received notification request is to be assigned.

Figure 5:
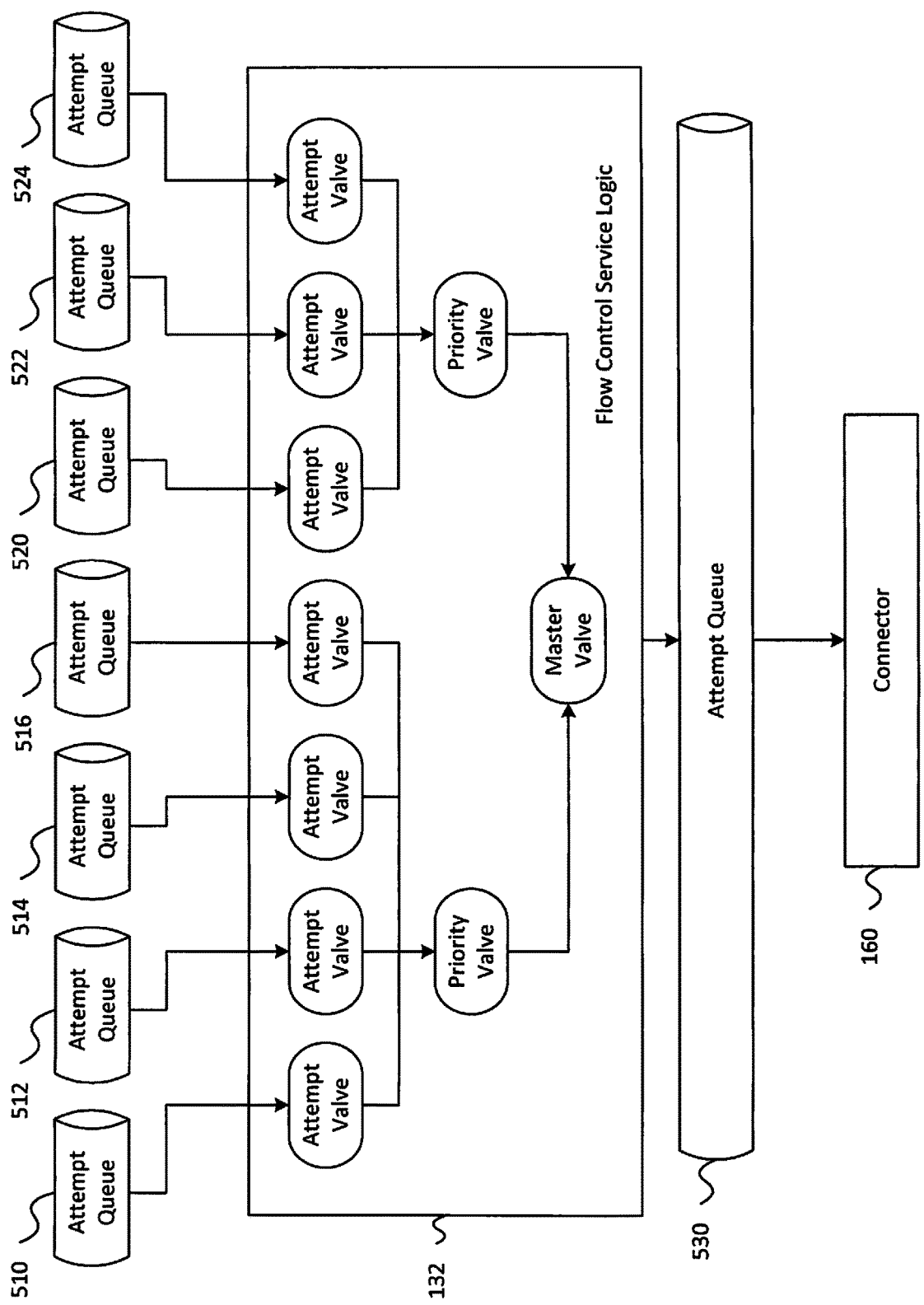
FIG. 5 is a block diagram illustrating exemplary aspects for implementing adaptive flow control at the attempt level.

Referring to FIG. 5, a block diagram illustrating exemplary aspects for implementing adaptive flow control at the attempt level in accordance with embodiments of the present disclosure is shown. In FIG. 5, a first plurality of attempt queues 510, 512, 514, 516, 520, 522, 524, the flow control logic 132 of FIG. 1, an attempt queue 530, and the connector 160 of FIG. 1 are shown. In the description that follows, it is assumed that the notification system 110 is operating utilizing two priority levels, and that the attempt queues 510, 512, 514, 516 correspond to attempt queues associated with attempts generated from notification requests having a first priority level (P-0) and the attempt queues 520, 522, 524 correspond to attempt queues associated with attempts generated from notification requests having a second priority level (P-1). The attempt queue 530 may correspond to an attempt queue established for queuing attempts to be transmitted by the connector 160. It is noted that although FIG. 5 illustrates only a single attempt queue 530 and a single connector, this is for purposes of illustration, rather than by way of limitation. For example, the attempt queue 530 may represent one attempt queue of a second plurality of attempt queues (e.g., a plurality of attempt queues established for a plurality of connectors of the notification system).

As illustrated in FIG. 5, the flow control service logic 132 may be configured to publish attempts from various ones of the attempt queues 510, 512, 514, 516, 520, 522, 524 to the attempt queue 530, and, once published to the attempt queue 530, the attempts may be transmitted to their intended recipients. The flow control service logic 132 may be configured to execute a set of rules for implementing an adaptive flow control configured to provide fair queuing with respect to publishing to the plurality of attempt queues 510, 512, 514, 516, 520, 522, 524. For example, in FIG. 5, the flow control service logic 132 is illustrated as having a plurality of valves (e.g., attempt valves, priority valves, and a master valve). It is noted that the valves illustrated in FIG. 5 have been provided for purposes of illustration, rather than by way of limitation, and that the term "valve" is used to illustrate concepts that may be implemented by software components (e.g., the instructions 116 of FIG. 1) to provide adaptive flow control functionality in accordance with embodiments of the present disclosure. Each of these valves represents a pathway through which attempts may flow from one of the respective first plurality of attempt queues to the attempt queue 530. The flow control service logic 132 may be configured to apply a set of weights to each of the first plurality of attempt queues to select one or more attempts from each queue for publishing to the attempt queue 530. In an embodiment, the number of attempts selected from each queue may be considered as how open the corresponding valve is. For example, if attempts from only one of the attempt queues 510, 512, 514, 516, 520, 522, 524 were published to the attempt queue 530, that may be viewed as the attempt valve corresponding to that one attempt queue being fully open (e.g., 100% of published attempts come from that attempt queue) while all remaining attempt valves are closed (e.g., 0% of published attempts come from these other attempt queues). Similarly, at the priority valve level, since all of the published attempts come from a single queue, one of the priority valves may be considered fully open while the other is fully closed, and at the master valve level, one side of the mater valve would be fully open and the other side would be fully closed.

In an embodiment, the flow control service logic 132 may utilize a set of weights to configure the various valves. For example, the set of weights may include a first weighting factor that indicates a relative percentage of attempts to be published to the attempt queue 530 for each priority level, which may be thought of as how open each priority valve is. The set of weights may further include one or more additional weighting factors that indicate which attempt queues are to be published to the attempt queue 530, as well as a relative percentage of attempts to be published from each queue on a per priority level basis. For example, the weights may indicate that 80% of published attempts are to come from priority level corresponding to attempt queues 510, 512, 514, 516 and the remaining 20% from the priority level corresponding to the attempt queues 520, 522, 524. Thus, the priority valve on the left-hand side of FIG. 5 may be considered as set to 80% open while the other priority valve may be considered set to 20% open. Assuming that 100 attempts will be published in this particular cycle, this means that 80 attempts will be published from the attempt queues 510, 512, 514, 516 and 20 attempts will be published from the attempt queues 520, 522, 524. The set of weights may further indicate that attempts are to be published from the attempt queues 510, 512, 514, 516 equally (e.g., 25% each or 20 attempts each), and for the attempt queues 520, 522, 524, the weights may indicate that 50% of the published attempts (e.g., 10 total attempts) are to be published from the attempt queue 520, 25% of the published attempts (e.g., 5 total attempts) are to be published from the attempt queue 522, and 25% of the published attempts (e.g., 5 total attempts) are to be published from the attempt queue 524. As shown above, the flow control service logic 132 may be configured to apply a set of weights against the attempt queues to determine a number of attempts to be published to the attempt queue 530. Further, the flow control service logic 132 may further apply different weights on a per queue and/or per priority level basis. This allows increased flexibility with respect to selecting attempts for publication to the attempt queue 530, such as to focus on a single queue or single priority level (e.g., to meet service level agreement requirements) or to account for imbalances in the quantity of attempts corresponding to different priority levels (e.g., if the notification system receives a substantially larger number of requests for one priority level relative to other priority levels). Additionally, the weighting scheme described above further enables the flow control service logic to implement control over the quantity of attempts published from individual queues regard across multiple priority levels simultaneously.

In an embodiment, the flow control service logic 132 may be configured to periodically reevaluate the weights applied to the different priority levels and/or the first plurality of attempt queues. For example, a sliding window may be defined, where the sliding window defines a time period for evaluating and adjusting the weights assigned to the different priority levels and/or individual attempt queues. For example, based on metrics determined during the sliding window, weights that dictate the number of attempts published to the attempt queue 530 for each priority level and/or for each attempt queue may be adjusted/altered. This may enable the flow control service 132 to dynamically respond to changes in the notification requests received by the notification system. For example, if the metrics indicate that the number of notification requests and/or attempts generated for a highest priority level are decreasing, the weights may be adjusted to increase the amount of processing and/or transmission resources allocated for processing notification requests (e.g., generating and transmitting attempts) corresponding to lower priority levels. In an embodiment, target levels may also be utilized to implement adaptive flow control techniques. For example, if a volume of notifications being processed for a particular priority level satisfies a target level for that particular priority level, notifications for other priority levels may be selected for processing when extra capacity is available or when weights are dynamically adjusted, but if the volume is less than the target, the notification engine may adjust the weights so that additional notifications for that particular priority level are processed. It is noted that a probabilistic approach may also be used.

As shown above, the flow control service logic 132 may implement a fair queuing scheme configured to prevent large broadcasts from "filling up" the output queues, which would block smaller broadcasts and/or higher priority broadcasts. Fair queuing according to embodiments provides a scheduling algorithm that allows multiple broadcasts to share a network link (e.g., connector), without having any particular broadcast take more than its "fair" share of bandwidth. For example, as described above, the flow control service may interleave notifications from all "active" broadcasts into the various connector-specific queues.

In an embodiment, the flow control service logic may be further configured to implement additional adaptive flow control techniques designed to prevent large broadcasts from "starving" other broadcasts. For example, as described above with reference to FIG. 3, in an embodiment, the notification system may be configured to dynamically determine a size of the broadcast as attempts are generated. Once a large broadcast is identified, an attempt queue dedicated to that broadcast may be established. For example, in FIG. 5, the attempt queue 516 may correspond to an attempt queue dedicated to a particular large broadcast. By establishing a dedicated attempt queue for large broadcasts, starvation of other broadcasts may be avoided. For example, if a broadcast resulted in 4,000 attempts being generated, and those attempts were placed in the same attempt queue as other small requests (e.g., small relative to the large broadcast), any small broadcasts queued after the large broadcast would have to wait for all 4,000 attempts to be transmitted before they could be published and transmitted. This may create an unreasonable delay. Accordingly, the 4,000 attempts may be placed in a separate queue, and the flow control service logic may select a portion of the 4,000 attempts during each window period. Further, attempts may be selected from different attempt queues corresponding based on their priority levels. For example, attempts at one priority level may be taken from different attempt queues corresponding to different size notification requests. As described above, selection of the attempts may be further based on a set of weights. These approaches allow large broadcasts to be processed efficiently without negatively impacting other broadcasts.

Additionally, it is noted that dividing attempts based on the connector that they are going to enables the notification system to handle each connector separately (e.g., using a separate connector queue, such as attempt queue 530). This allows the flow control service logic 132 to apply different weights to different priority levels across the different connectors, as well as applying different weights to the attempt queues across each priority level o read some attempts from each queue, so that a giant broadcast won't block other, smaller broadcasts. It is also noted that by providing separate paths for processing small and large broadcasts, such as through creation of dedicated attempt queues for large broadcasts, and then interleaving attempts from all attempt queues during publishing of the attempts to the connector queue, delays imposed on broadcasts due to other broadcasts are minimized.

Figure 6:
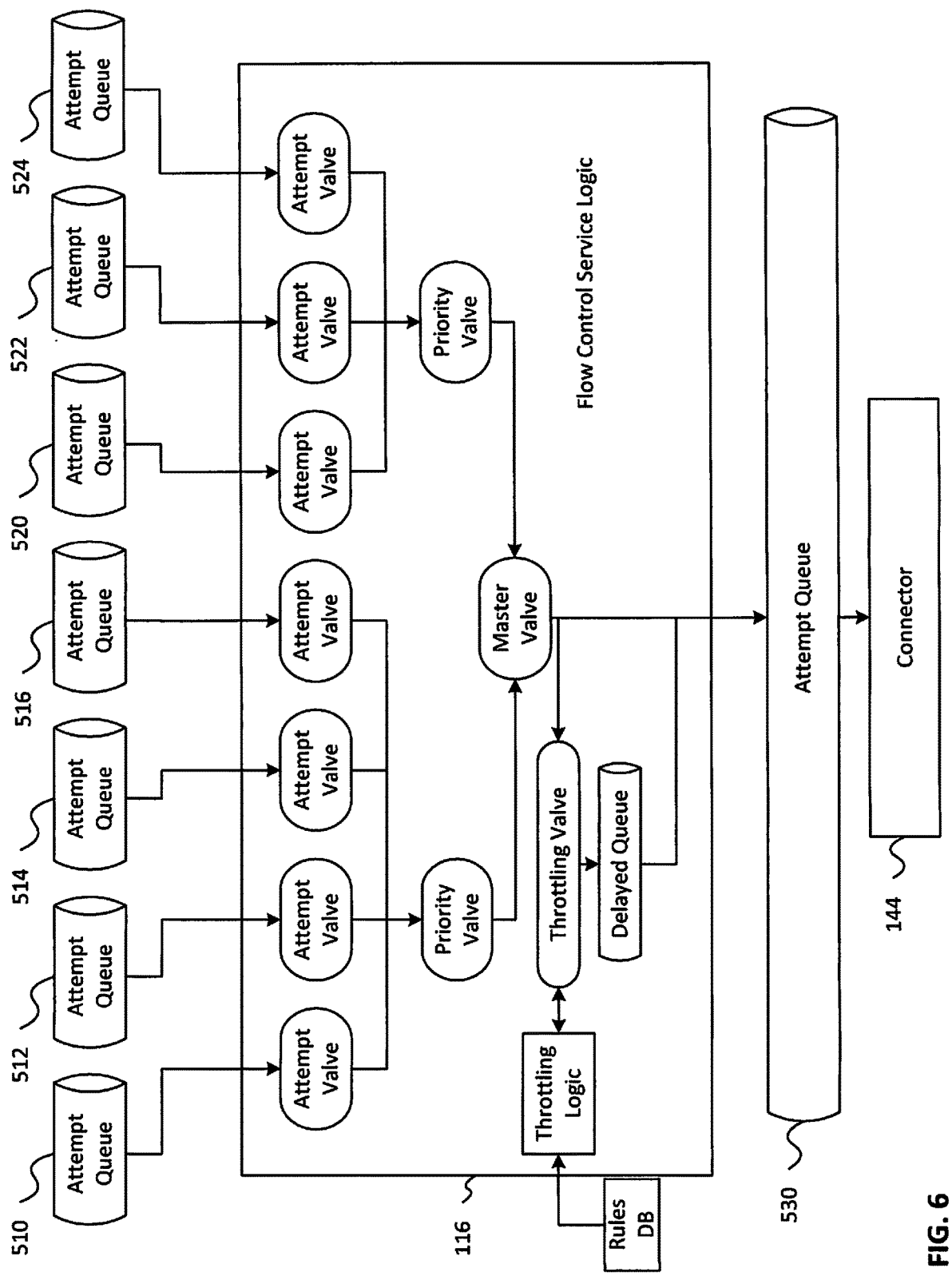
FIG. 6 is a block diagram illustrating exemplary aspects for implementing adaptive flow control based on throttling in accordance with embodiments of the present disclosure.

Referring to FIG. 6, a block diagram illustrating exemplary aspects for implementing throttling in accordance with embodiments of the present disclosure is shown. In FIG. 6, the concepts illustrated and described with reference to FIG. 5 are shown. Further, FIG. 6 illustrates an embodiment of a notification system configured to implement throttling in addition to adaptive flow control techniques. Throttling may be used to limit certain processing of attempts, such as transmission of attempts utilizing calls and/or AVR messages. For example, a user may specify rules that control how many concurrent calls may be placed into a location (e.g., a phone number, a private branch exchange (PBX), a local exchange, etc.). The location may be specified by a prefix pattern for a phone number, and the amount of concurrent calls may be configured to prevent overloading (e.g., overloading the PBX at a company, or the local exchange for a neighborhood). The notification engine 130 may then regulate the number of concurrent active calls for each throttling rule and may delay (e.g., throttle) placing calls that would exceed the specified limit. Implementing throttling techniques over the top of the adaptive flow control techniques described above may provide important safeguards, especially for large broadcasts. For example, a PBX may capable of handling up to 100 concurrent calls, but a notification may be configured to be sent to 10,000 employees at a location served by the PBX. Without implementing throttling logic, the notification could tie up all of the phones at the location served by the PBX for an extended period of time as the system attempts 10,000 calls, which could impact handling of an emergency. Call throttling enables the operator of the notification system 110 to configure a rule to say that prevents the notification system from exceeding the capabilities of other systems, such as by preventing more than a threshold number of concurrent calls made to a PBX. The throttling rules may be stored in a rules database, as shown in FIG. 6.

The throttling logic may be configured to track used and remaining capacity for each throttling rule. When an attempt matches a throttling rule and there is sufficient capacity remaining, the throttling logic will queue the attempt for processing by the appropriate connector and adjust the remaining capacity. When the attempt succeeds, the throttling logic updates the available capacity for the throttling rule. If there is not sufficient capacity remaining in the throttling rule, the attempt is deferred by placing it into a delayed queue, and replaced with a different attempt. If there are deferred attempts, those have already been processed by the weighted fair queuing described above with reference to FIGS. 1-5, and are considered to be "ahead" of any new attempts, so when the flow-control service begins a cycle, it will first check the delayed queue to see if there are any attempts which can now be sent because some "capacity" for that throttle rule has been freed up. These "throttled" attempts may be removed from the delayed queue and sent to the attempt queue for processing, with appropriate adjustment to the remaining throttle capacity. After any newly throttled attempts have been queued for processing, the remaining attempts for this cycle will be retrieved from the various priorities, as described above.

Additionally, adaptive flow control techniques for providing throttling according to embodiments may implement a distributed throttling mechanism. For example, embodiments of the present disclosure enable throttling limits to be applied globally (e.g., across a plurality of notification engines) in a distributed manner. This allows each notification engine to operate independently while coordinating overall notification rates across all notification engines in a manner that does not exceed the throttling limit. In an embodiment, the notification system 110 may include a global throttling coordinator (not shown in FIG. 1) that communicates with the notification engines to implement global throttling of notifications. It is noted that global throttling may be implemented in conjunction with other adaptive flow control techniques disclosed herein.

In an embodiment, the notification system 110 may also use throttling information to dynamically adapt its operations. For example, the notification system 110 may utilize call status information and to detect when a load imposed by attempts is causing errors, such as errors at a PBX or local exchange, and may adapt its operations to mitigate those errors. For example, the notification system 110 may dynamically adjust or apply call throttling in response to those errors.

Figure 7:
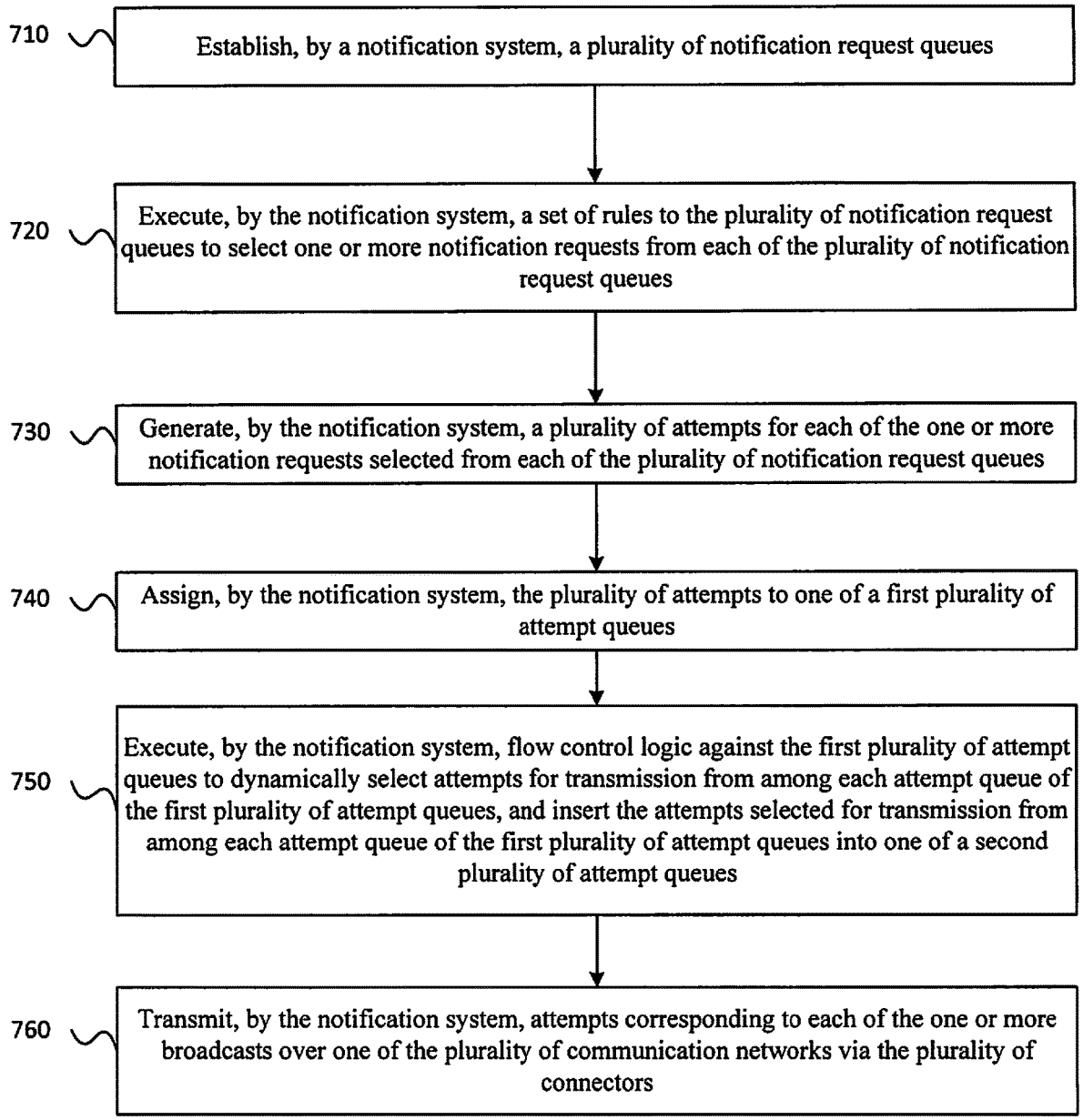
FIG. 7 is a flow diagram of a method for providing dynamic flow control in a notification system in accordance with embodiments of the present disclosure.

Referring to FIG. 7, a flow diagram of a method for providing dynamic flow control in a notification system in accordance with embodiments of the present disclosure is shown as a method 700. In an embodiment, the method 700 may be stored as instructions, such as the instruction 116 of FIG. 1, that when executed by one or more processors, cause the one or more processors to perform the operations of the method 700.

At 710, the method 700 includes establishing, by a notification system, a plurality of notification request queues. Each notification request queue of the plurality of notification request queues may be configured to store one or more received notification requests, and each received notification request may include event information and recipient information. At 720, the method 700 includes executing, by the notification system, a set of rules to the plurality of notification request queues to select one or more notification requests from each of the plurality of notification request queues. The set of rules may be configured to select the one or more notification requests from each of the plurality of notification request queues in accordance with a set of weights. At 730, the method 700 include generating, by the notification system, a plurality of attempts for each of the one or more notification requests selected from each of the plurality of notification request queues. Each attempt of the plurality of attempts may include a message for transmission to a recipient identified by recipient information included in a corresponding notification request.

At 740, the method 700 includes assigning, by the notification system, the plurality of attempts to one of a first plurality of attempt queues, and, at 750, executing, by the notification system, flow control logic against the first plurality of attempt queues to dynamically select attempts for transmission from among each attempt queue of the first plurality of attempt queues, and insert the attempts selected for transmission from among each attempt queue of the first plurality of attempt queues into one of a second plurality of attempt queues, as described above with respect to FIGS. 1-5. Each of the one or more broadcasts comprising one or more attempts generated from a corresponding notification request. In an embodiment, the flow control logic may be configured to perform the operations described above with respect to the flow control service logic 132. For example, the flow control service logic may be configured to dynamically select attempts for transmission from among each attempt queue of the first plurality of attempt queues, and to publish the attempts selected for transmission from among each attempt queue of the first plurality of attempt queues into one of a second plurality of attempt queues. Each attempt queue of the second plurality of attempt queues may be associated with one of a plurality of connectors, and each connector of the plurality of connectors may be configured to communicatively couple the notification system to a plurality of communication networks. At 760, the method 700 includes transmitting, by the notification system, attempts corresponding to each of the one or more broadcasts over one of the plurality of communication networks via the plurality of connectors. It is noted that the method 700 may further include additional operations described above with reference to FIGS. 1-6.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed:

1. A method comprising:
   establishing, by a notification system, a plurality of notification request queues, wherein each notification request queue of the plurality of notification request queues is configured to store one or more received notification requests, and wherein each received notification request comprises message content and recipient information;
   executing, by the notification system, a set of rules to the plurality of notification request queues to select one or more notification requests from each of the plurality of notification request queues;
   generating, by the notification system, a plurality of attempts for each of the one or more notification requests selected from each of the plurality of notification request queues, each attempt of the plurality of attempts comprising a message for transmission to a recipient identified by recipient information included in a corresponding notification request;
   assigning, by the notification system, the plurality of attempts to one of a first plurality of attempt queues;

executing, by the notification system, flow control logic against the first plurality of attempt queues to:
dynamically select attempts for transmission from among each attempt queue of the first plurality of attempt queues, and insert the attempts selected for transmission from among each attempt queue of the first plurality of attempt queues into one of a second plurality of attempt queues, wherein each attempt queue of the second plurality of attempt queues is associated with one of a plurality of connectors, and wherein each connector of the plurality of connectors is configured to communicatively couple the notification system to a plurality of communication networks; and
transmitting, by the notification system, attempts corresponding to each of the one or more notification requests over one of the plurality of communication networks via the plurality of connectors.

2. The method of claim 1, wherein establishing the plurality of notification request queues comprises generating a notification request queue for each of a plurality of notification request priority levels, the method comprising:
determining, by the notification system, a priority level associated with each received notification request; and
assigning, by the notification system, each received notification request to a notification request queue corresponding to its priority level.

3. The method of claim 1, wherein establishing the plurality of notification request queues comprises generating a plurality of notification request queues for each of a plurality of notification request priority levels, wherein a particular plurality of notification request queues corresponding to a particular priority level of the plurality of notification request priority levels comprises a notification request queue for each of a plurality of notification request sizes, the method comprising:
determining, by the notification system, a priority level and a size associated with each received notification request; and
assigning, by the notification system, each received notification request to a notification request queue corresponding to its priority level and size.

4. The method of claim 1, further comprising dynamically determining, by the notification system, a size of each notification, wherein the size of each notification is dynamically determined by:
tracking a count of attempts generated for each notification request;
determining whether the count of attempts generated for a particular notification request exceeds a size threshold; and
classifying the size of each notification based on whether the corresponding count of attempts exceeds the size threshold.

5. The method of claim 4, further comprising dynamically establishing, by the notification system, at least one additional attempt queue in response to determining that the count of attempts for at least one notification request exceeds the size threshold, wherein attempts generated for the at least one notification request are assigned to the at least one additional attempt queue.

6. The method of claim 1, further comprising:
receiving, by the notification system, responses associated with attempts of a broadcast corresponding to a particular notification request; and
in response to receiving the responses, determining whether to cancel transmission of one or more additional attempts of the broadcast, wherein the responses are received in connection with transmission of the attempts of the broadcast using a first connector, and wherein the one or more additional attempts of the broadcast correspond to attempts that are scheduled to be transmitted using one or more connectors of the plurality of connectors other than the first connector.

7. The method of claim 1, further comprising:
monitoring processing of the notification requests selected from the plurality of notification request queues to identify a load at one or more components of the notification system involved in the processing;
determining whether a load of the one or more components involved in the processing exceeds a load threshold; and
implementing backpressure signaling to reduce a load of at least one component in response to determining that the load of the at least one component exceeds the load threshold.

8. The method of claim 1, wherein the plurality of attempts comprise at least one of an e-mail message, a short messaging service (SMS) message, a multimedia messaging service (MMS) message, and an automated voice response (AVR) message.

9. The method of claim 1, wherein the plurality of connectors comprise communication devices configured to transmit data according to one or more communication protocols, the one or more communication protocols including at least one of a cellular communication protocol, a transmit control protocol/Internet protocol (TCP/IP), an Ethernet protocol, and a voice over Internet protocol (VoIP).

10. The method of claim 1, wherein the plurality of communication networks include at least one of a cellular communication network, the Internet, and a public switched telephone network (PSTN).

11. The method of claim 1, wherein the dynamic selection of attempts for transmission from among each attempt queue of the first plurality of attempt queues is based on a set of weights that includes weighting factors associated with at least one of different priority levels and a notification request size.

12. The method of claim 1, wherein the first plurality of attempt queues includes a different attempt queue for each of a plurality of different priority levels, and wherein each attempt is assigned to a respective one of the first plurality of attempt queues based on a priority level of a notification request from which they are generated.

13. A non-transitory computer-readable storage medium storing instructions that, when executed by one or more processors, cause the one or more processors to perform operations comprising:
establishing, by a notification system, a plurality of notification request queues, wherein each notification request queue of the plurality of notification request queues is configured to store one or more received notification requests, and wherein each received notification request comprises message content and recipient information;
executing, by the notification system, a set of rules to the plurality of notification request queues to select one or more notification requests from each of the plurality of notification request queues, wherein the set of rules comprises a set of weights, and wherein the set of rules are configured to select the one or more notification requests from each of the plurality of notification request queues in accordance with the set of weights;
generating, by the notification system, a plurality of attempts for each of the one or more notification requests selected from each of the plurality of notification request queues, each attempt of the plurality of attempts comprising a message for transmission to a recipient identified by recipient information included in a corresponding notification request;

assigning, by the notification system, the plurality of attempts to one of a first plurality of attempt queues;

executing, by the notification system, flow control logic against the first plurality of attempt queues to generate one or more broadcasts, each of the one or more broadcasts comprising one or more attempts generated from a corresponding notification request, wherein the flow control logic is configured to:

dynamically select attempts for transmission from among each attempt queue of the first plurality of attempt queues; and insert the attempts selected for transmission from among each attempt queue of the first plurality of attempt queues into one of a second plurality of attempt queues, wherein each attempt queue of the second plurality of attempt queues is associated with one of a plurality of connectors, and wherein each connector of the plurality of connectors is configured to communicatively couple the notification system to a plurality of communication networks; and transmitting, by the notification system, attempts corresponding to each of the one or more broadcasts over one of the plurality of communication networks via the plurality of connectors.

14. The non-transitory computer-readable storage medium of claim 13, wherein the dynamic selection of attempts for transmission from among each attempt queue of the first plurality of attempt queues is based on a set of weights that includes weighting factors associated with at least one of different priority levels and a notification request size.

15. The non-transitory computer-readable storage medium of claim 13, wherein the first plurality of attempt queues includes a different attempt queue for each of a plurality of different priority levels, and wherein each attempt is assigned to a respective one of the first plurality of attempt queues based on a priority level of a notification request from which they are generated.

16. The non-transitory computer-readable storage medium of claim 13, wherein the operations include applying call throttling rules to a set of attempts to control a rate at which the set of attempts are transmitted.

17. A notification system comprising:

a plurality of connectors, wherein each connector of the plurality of connectors is communicatively coupled to one of a plurality of communication networks;

a plurality of notification request queues, wherein each notification request queue of the plurality of notification request queues is configured to store one or more received notification requests, and wherein each received notification request comprises message content and recipient information;

a first plurality of attempt queues;

a second plurality of attempt queues, wherein each attempt queue of the second plurality of attempt queues is associated with one of the plurality of connectors;

a memory; and at least one processor configured to:

execute a set of rules to the plurality of notification request queues to select one or more notification requests from each of the plurality of notification request queues;

generate a plurality of attempts for each of the one or more notification requests selected from each of the plurality of notification request queues, each attempt of the plurality of attempts comprising a message for transmission to a recipient identified by recipient information included in a corresponding notification request;

assign the plurality of attempts to one of the first plurality of attempt queues; and execute flow control logic against the first plurality of attempt queues to dynamically select attempts for transmission from among each attempt queue of the first plurality of attempt queues, and insert the attempts selected for transmission from among each attempt queue of the first plurality of attempt queues into one of the second plurality of attempt queues, wherein the plurality of connectors are configured to transmit attempts selected from a corresponding one of the second plurality of attempt queues.

18. The notification system of claim 17, wherein the dynamic selection of attempts for transmission from among each attempt queue of the first plurality of attempt queues is based on a set of weights that includes weighting factors associated with at least one of different priority levels and a notification request size.

19. The notification system of claim 17, wherein the first plurality of attempt queues includes a different attempt queue for each of a plurality of different priority levels, and wherein each attempt is assigned to a respective one of the first plurality of attempt queues based on a priority level of a notification request from which they are generated.

20. The notification system of claim 17, wherein the at least one processor is further configures to apply call throttling rules to a set of attempts to control a rate at which the set of attempts are transmitted.

* * * * *